(12) United States Patent
Jones et al.

(10) Patent No.: US 12,735,984 B2
(45) Date of Patent: Sep. 15, 2026

(54) DETERMINATION OF DOWNHOLE FORMATION FLUID CONTAMINATION AND CERTAIN COMPONENT CONCENTRATIONS

(71) Applicants: Halliburton Energy Services, Inc., Houston, TX (US); Petroleo Brasileiro S.A.—Petrobas, Rio de Janeiro (BR)

(72) Inventors: Christopher Jones, Katy, TX (US); Ralph Engel Piazza, Rio de Janeiro (BR); Anthony H. Van Zuilekom, Houston, TX (US); Megan Renee Pearl, Spring, TX (US); Luiz Alexandre Sacorague, Rio de Janeiro (BR); Alexandre Jaime Mello Vieira, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 250 days.

(21) Appl. No.: 18/330,267

(22) Filed: Jun. 6, 2023

(65) Prior Publication Data

US 2023/0313680 A1 Oct. 5, 2023

Related U.S. Application Data

(63) Continuation of application No. 16/627,164, filed as application No. PCT/US2018/033516 on May 18, 2018, now Pat. No. 11,697,992.

(51) Int. Cl.
*E21B 49/08* (2006.01)
*G01V 8/10* (2006.01)

(52) U.S. Cl.
CPC .............. *E21B 49/088* (2013.01); *G01V 8/10* (2013.01); *E21B 49/0875* (2020.05)

(58) Field of Classification Search
CPC ...... E21B 49/088; E21B 49/0875; G01V 8/10
See application file for complete search history.

(56) References Cited

U.S. PATENT DOCUMENTS

2010/0192684 A1 8/2010 Wu et al.
2011/0308391 A1 12/2011 Degreeve et al.
(Continued)

FOREIGN PATENT DOCUMENTS

CN 107076872 6/2019
CN 106522937 2/2020
(Continued)

OTHER PUBLICATIONS

PCT Application No. PCT/US2018/033516, International Search Report, mailed Feb. 14, 2019, 3 pages.
(Continued)

*Primary Examiner* — Michael J Dalbo
*Assistant Examiner* — Kaleria Knox
(74) *Attorney, Agent, or Firm* — DeLizio, Peacock, Lewin and Guerra, LLP

(57) ABSTRACT

A method and system may include receiving, via one or more sensors in a wellbore formed in a subsurface formation, measurements of a concentration of an interactive component and a concentration of a non-interactive component in a formation fluid from the subsurface formation, wherein the non-interactive component and the interactive component comprise a component in the formation fluid that is non-interactive and interactive, respectively, with respect to a drilling fluid. The method and system may further include determining a level of contamination from a drilling fluid filtrate that contaminates the formation fluid based on the non-interactive component concentration in the formation fluid and the interactive component concentration in the formation fluid.

20 Claims, 6 Drawing Sheets

(56) References Cited

U.S. PATENT DOCUMENTS

| | | | | |
|---|---|---|---|---|
| 2011/0313670 | A1* | 12/2011 | DeGreeve | E21B 49/00 356/51 |
| 2012/0211650 | A1* | 8/2012 | Jones | E21B 49/10 250/269.1 |
| 2014/0180591 | A1* | 6/2014 | Hsu | E21B 49/10 702/8 |
| 2016/0130696 | A1 | 5/2016 | Price et al. | |
| 2016/0178793 | A1* | 6/2016 | Vijayakumar | G01V 8/02 356/409 |
| 2017/0175465 | A1 | 6/2017 | Dickenson et al. | |
| 2020/0157937 | A1 | 5/2020 | Jones et al. | |

FOREIGN PATENT DOCUMENTS

| | | | | |
|---|---|---|---|---|
| GB | 2400910 | A * | 10/2004 | G01N 33/2823 |
| WO | WO-2015191084 | A1 * | 12/2015 | G02B 27/60 |
| WO | 2016076825 | A1 | 5/2016 | |

OTHER PUBLICATIONS

PCT Application No. PCT/US2018/033516, International Written Opinion, mailed Feb. 14, 2019, 12 pages.
U.S. Appl. No. 16/627,164, Non-Final Office Action, mailed Dec. 15, 2021, 25 pages.
"U.S. Appl. No. 16/627,164, Final Office Action", Jul. 14, 2022, 27 pages.
"U.S. Appl. No. 16/627,164, Non-Final Office Action", Nov. 8, 2022, 17 pages.
"BR Application No. BR 11 2019 028021 9 Office Action", Nov. 5, 2023, 7 pages.

* cited by examiner

DETERMINATION OF DOWNHOLE FORMATION FLUID CONTAMINATION AND CERTAIN COMPONENT CONCENTRATIONS

BACKGROUND

This application relates to a method of determining drilling fluid filtrate contamination of a downhole formation fluid and a method of determining drilling fluid interactive component concentrations, such as that of carbon dioxide or hydrogen sulfide concentrations in a downhole formation fluid and drilling fluid filtrate mixture. Both methods use real-time measurements of a downhole fluid comprising the formation fluid for the determination of contamination and carbon dioxide, hydrogen sulfide or other interactive component concentrations.

In certain practices, it is of particular interest to determine the level of contamination of a formation fluid. The contamination concerned may be caused by drilling fluid filtrate or oil-based mud filtrate. While it is possible to obtain the contamination level by analyzing the sampled fluid in a laboratory, such a practice is not practical for real time field operations. Hence, there is a need for determining drilling fluid filtrate or oil-based mud filtrate contamination using subterranean real time measurements of a downhole fluid comprising a formation fluid.

DETAILED DESCRIPTION

Figure 1:
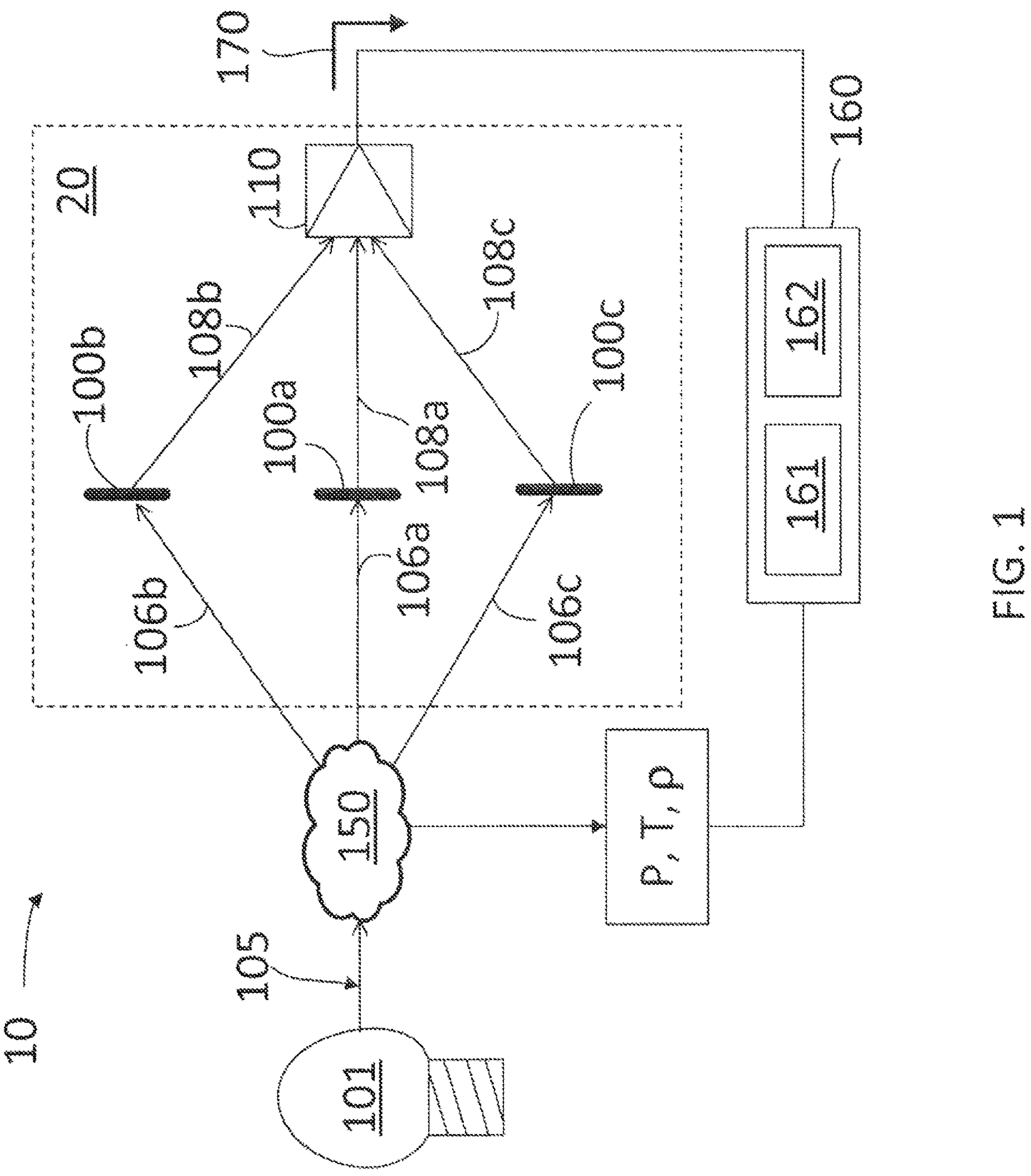
FIG. 1 illustrates an optical computing device in a downhole tool, the optical computing device configured to measure a characteristic of a fluid.

Downhole measurements of a fluid comprising a formation fluid may provide information about characteristics of the formation fluid and/or the components in the reservoir fluid downhole. Downhole fluid analysis (DFA) is often used to provide information in real time about the characteristics of subterranean formations and/or the compositions of formation or reservoir fluids. The real time measurements may provide, for example, density information of the downhole fluid, the amounts of certain components in the fluids such as carbon dioxide ($CO_2$) and $C_1$-$C_5$ alkanes (e.g., methane, ethane, propane, etc.), gas-oil ratio (GOR), for example. The downhole tool which may perform these measurements include optical computing devices incorporating integrated computational elements (ICEs) that enable a simplified way to detect a characteristic of a sample by measuring the intensity of an output light from the sample after interacting with the ICE. In embodiments consistent with the present disclosure, an ICE may also be referred to as a multivariate optical element (MOE).

ICE technology may operate with light shining through, transmitted (or scattered) from downhole fluids and then through sensors. Each sensor may be programmed to recognize the chemical nature—or optical fingerprint—of a specific fluid component. Measuring the intensity of light passing through any one sensor indicates the presence and amount of a particular chemical component within the overall fluid. Tools with such sensors are placed downhole and may provide real time measurements of a fluid comprising the formation fluid flowing through the sensor such as a density of such a fluid and amounts of certain chemicals in the fluid flowing through the sensor.

In some embodiments, a device as disclosed herein determines a characteristic of a fluid (e.g., the amount of $CO_2$ in formation fluid downhole). The characteristic of the fluid may have a direct bearing on the value of a potential reserve. Furthermore, determining the characteristic of the fluid may be used to determine a capital investment needed to produce a field, specifically when designing surface production facilities and completion strategies.

In some configurations, drilling fluid filtrate may contain compounds designed to scavenge acidic compounds such as hydrogen sulfide and carbon dioxide. Further the drilling fluid may interact selectively with other acidic or non-acidic compounds such as but not limited to the mechanism of chelation or ligand coordination. Acid scavengers include but are not limited to, for example, alkaline compounds, e.g., amines which may bind with carbon dioxide through either non-covalent bond (e.g., coordinating or complexing with carbon dioxide) or covalent bond. Non-covalent bonding is inclusive of any attractive mechanism that does not include molecular electron sharing such as that of ionic forces or weekly attractive forces including but not limited to electrostatic charge forces, dipole forces or induced dipole forces. This binding reaction may be reversed by application of heat or reduction in pressure to drive the equilibrium to recover the acidic component. Thus, free-form carbon dioxide in a drilling fluid filtrate contaminated sample at reservoir conditions is present in a lower amount than that of carbon dioxide in that same sample at surface conditions, such as in a laboratory. The binding action between carbon dioxide and drilling fluid filtrate prevents downhole measurements, which are sensitive to only free-form carbon dioxide, from determining an accurate estimation of the total amount of carbon dioxide when drilling fluid filtrate is present. In some embodiments, techniques as disclosed herein provide a total concentration of carbon dioxide present in a downhole formation fluid being withdrawn from a reservoir by correcting for the effects of drilling fluid filtrate contamination.

Some embodiments of this application relate to a method, which comprises obtaining real time property measurements of a fluid comprising a formation fluid downhole, obtaining real time measurements of an amount of an interactive component of the fluid downhole, obtaining real time measurements of an amount of a non-interactive component of the fluid downhole, and determining a contamination level of the formation fluid at a time of interest based on the real time property measurements of the fluid downhole and the real time measurements of the amounts of the interactive component and non-interactive component downhole, wherein the real time measurements of the amount of the interactive component downhole are real time measurements of the interactive component in its free form downhole.

Some embodiments of this application relate to a method, which comprises obtaining real time property measurements of a fluid comprising a formation fluid downhole, obtaining real time measurements of an amount of an interactive component of the fluid downhole, obtaining real time measurements of an amount of a non-interactive component of the fluid downhole, and determining the total amount of the interactive component in the fluid at a time of interest based on the real time property measurements of the fluid downhole and the real time measurements of the amounts of the interactive component and non-interactive component downhole, wherein the real time measurements of the amount of the interactive component downhole are real time measurements of the interactive component in its free form downhole.

The real time measurements may be obtained, for example, by a tool having a sensor including an optical computing device as disclosed herein. The tool with the optical computing device may be incorporated in a drilling system or a wireline system to measure a characteristic of a fluid.

As used herein, the term "characteristic" refers to a chemical, mechanical, or physical property of a fluid (e.g., a downhole fluid in an oil and gas rig or wellbore). A characteristic of a fluid may include a quantitative or qualitative value of one or more chemical constituents or compounds present therein or any physical property associated therewith. Such chemical constituents and compounds may be referred to herein as "analytes." Illustrative characteristics of a substance that may be monitored with the optical computing devices described herein may include, for example, chemical composition e.g., identity and concentration in total or of individual components), phase presence (e.g., $CO_2$, gas, oil, water, etc.), impurity content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "electromagnetic radiation" refers to radio waves, microwave radiation, infrared and near-infrared radiation, visible light, ultraviolet light, X-ray radiation and gamma ray radiation.

As used herein, the term "optical computing device" refers to an optical device that is configured to receive an input of electromagnetic radiation associated with a fluid and produce an output of electromagnetic radiation from a processing element (e.g., ICE) arranged within the optical computing device. The electromagnetic radiation that optically interacts with the processing element is changed so as to be readable by a detector, such that an output of the detector may be correlated to a particular characteristic of the substance. The output of electromagnetic radiation from the processing element may be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, may also be monitored by optical computing devices.

As used herein, the term "optically interact" or variations thereof refers to the reflection, transmission, scattering, diffraction, or absorption of electromagnetic radiation either on, through or from one or more processing elements (i.e., ICE or MOE components) or a substance being analyzed by the processing elements. Accordingly, optically interacted light refers to electromagnetic radiation that has been reflected, transmitted, scattered, diffracted, or absorbed by, emitted, or re-radiated, for example, using a processing element, but may also apply to interaction with a substance. As mentioned above, the processing element used in the above-defined optical computing devices may be an ICE. In operation, an ICE is capable of distinguishing electromagnetic radiation related to a characteristic of interest of a substance from electromagnetic radiation related to other components of the substance.

FIG. 1 illustrates an optical computing device 20 that may be used in a downhole tool 10. Optical computing device 20 is configured to measure a characteristic of a fluid. Downhole tool 10 includes a light source 101 providing an illumination light 105 (e.g., electromagnetic radiation) that impinges on a sample 150 of the fluid, such as a downhole fluid encountered in the oil and gas industry during drilling and borehole logging operations. Optical computing device 20 includes ICEs 100*a*, 100*b*, and 100*c* (hereinafter collectively referred to as ICEs 100). Accordingly, optical computing device 20 includes optical elements to direct a portion of an interacted light 106*a* to ICE 100*a*, a portion of an interacted light 106*b* to ICE 100*b*, and a portion of an interacted light 106*c* to ICE 100*c*. Further, optical computing device 20 includes optical elements to direct a computed light 108*a* from ICE 100*a* to a detector 110, a computed light 108*b* from ICE 100*b* to detector 110, and a computed light 108*c* from ICE 100*c* to detector 110. Detector 110 may also be configured separately to receive computed light from each of the individual ICEs 100. Hereinafter, interacted lights 106*a-c* will be collectively referred to as interacted lights 106, and computed lights 108*a-c* will be collectively referred to as computed lights 108.

Without limitation, the number of ICEs 100 in optical computing device 20 may be only one, two, three (as illustrated in FIG. 1), or more or less. Furthermore, without limitation any one of ICEs 100 may be used with a broadband filter, a narrow band filter, a neutral density filter, a grating element, a diffraction prism, or any other type of spectroscopic resolving optical element as known to those with ordinary skill. In that regard, a first ICE 100 in a first optical computing device 20 may be associated with a first fluid characteristic, and a second ICE 100 in a second optical computing device 20 may be associated with a second fluid characteristic. Without limitation, the first fluid characteristic and the second fluid characteristic may be the same or may be different. In some embodiments, a second ICE 100 may be disassociated with the first fluid characteristic. Accordingly, a second computed light 108 may have an intensity that is unrelated to the first fluid characteristic.

A detector 110 receives computed lights 108 and generates a signal 170 proportional to the intensity of computed lights 108. In some embodiments, downhole optical tool 10 uses available measurements from other sensors to get reference fluid pressure (P), temperature (T), density (p), and other parameters associated with sample 150, such as fluid viscosity, bubble point, and the like. Accordingly, the reference P, T, and p data collected with downhole optical tool that are compatible to the corresponding pressure, volume, and temperature (PVT) measurements of a standard calibration database may be used as inputs of fluid predictive models.

In some embodiments, interacted lights 106 may be referred to as "sample lights," and computed lights 108 are sample lights interacted with ICEs 100. In some embodiments, it is desirable that the intensity of at least one of computed lights 108 be proportional to the fluid characteristic being measured. In some embodiments, the intensity of computed lights 108 may be related to the fluid characteristic through a non-linear relationship involving multiple factors. For example, in some embodiments P, T and other environmental factors measured by downhole tool 10 affect the relation between computed light 108 and the fluid characteristic.

In still further embodiments, optical computing device 20 may obtain real time measurements of an amount of an interactive component of the fluid downhole, and real time measurements of an amount of a non-interactive component of the fluid downhole.

A controller 160 in downhole tool 10 uses the signal from detector 110 and the measured P, T, and ρ values to determine a characteristic of the downhole fluid forming sample 150. Controller 160 may include a processor 161 and a memory 162. Memory 162 may store commands in a pre-calibrated optical signal transformation algorithm and in a fluid predictive model which, when executed by processor 161 cause controller 160 to perform at least some steps in methods for analyte detection and fluid characterization as disclosed herein. While controller 160 may be included in downhole tool 10, in some embodiments, controller 160 may be at the surface and communicating with downhole tool 10, which may be near or at the bottom of a borehole in an oil and gas operation.

Processor 161 may be configured to perform optical fluid analysis using non-linear neural network (NN) transformation and predictive algorithms stored in memory 162. In some embodiments, processor 161 performs the non-linear optical analysis in real-time. Sample 150 may include heavy oils, medium and light oils, gas condensates and gas, water, multiphase mixtures and other fluids relevant to downhole fluid analysis.

Figure 2:
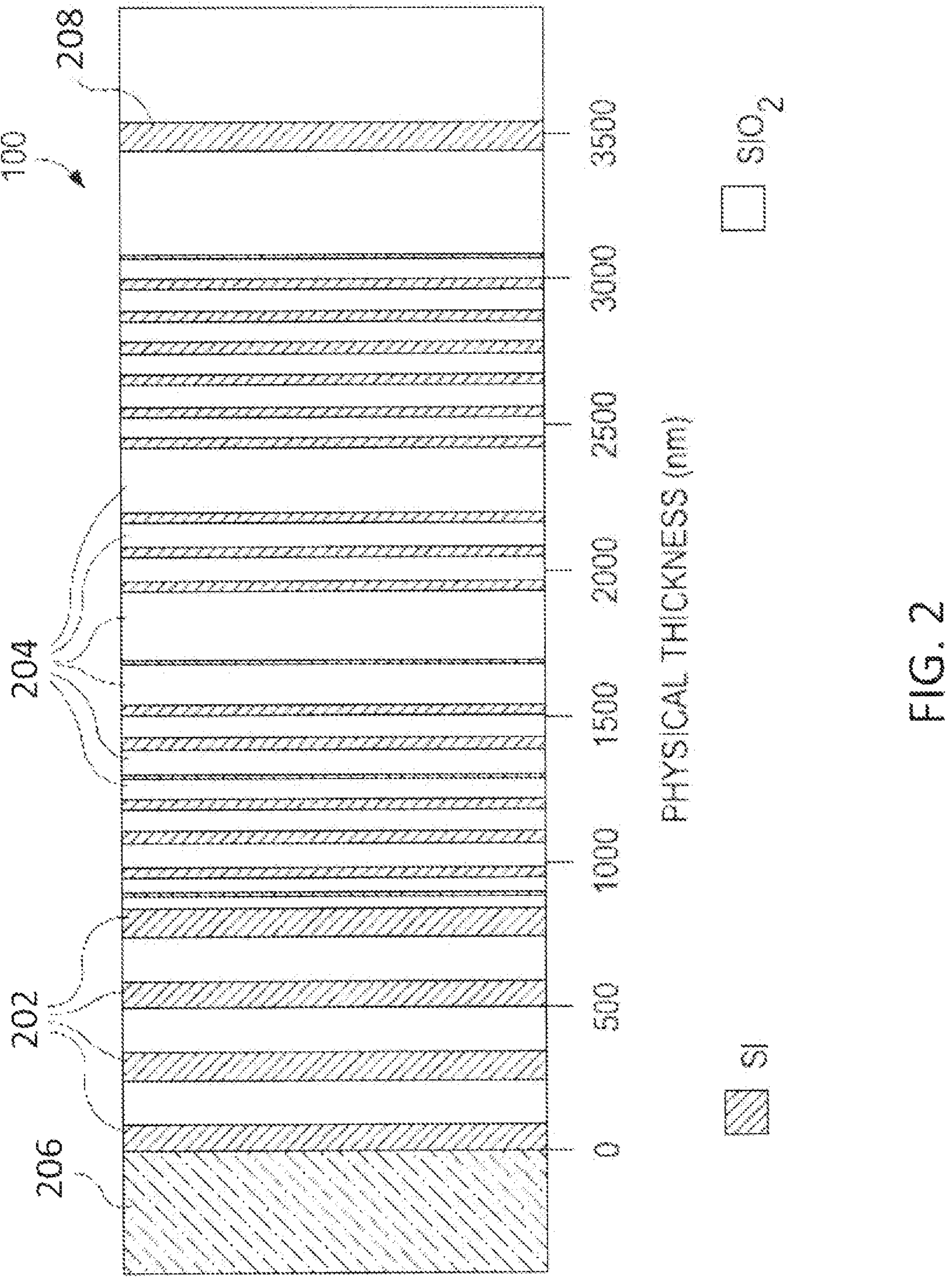
FIG. 2 illustrates an integrated computational element for use in an optical computing device for a downhole tool.

FIG. 2 illustrates an ICE 100 for use in an optical computing device for a downhole tool. As illustrated, ICE 100 may include a plurality of alternating layers 202 and 204, such as silicon (Si) and $SiO_2$ (quartz), respectively. In general, layers 202, 204 include materials whose index of refraction is high and low, respectively. Other examples of materials might include niobia and niobium, germanium and germania, MgF, SiO, and other high and low index materials known in the art. Layers 202, 204 may be strategically deposited on an optical substrate 206. In some embodiments, optical substrate 206 is BK-7 optical glass. In other embodiments, the optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), or diamond, or ceramics, combinations thereof, and the like.

At the opposite end (e.g., opposite the optical substrate 206 in FIG. 2), the ICE 100 may include a layer 208 that is generally exposed to the environment of the device or installation, and may be able to detect a sample substance. The number of layers 202, 204 and the thickness of each layer 202, 204 are determined from the spectral attributes acquired from a spectroscopic analysis of a characteristic of the substance being analyzed using a conventional spectroscopic instrument. The spectrum of interest of a given characteristic typically includes any number of different wavelengths. It should be understood that the exemplary ICE 100 in FIG. 2 does not in fact represent any particular characteristic of a given substance, but is provided for purposes of illustration only. Consequently, the number of layers 202, 204 and their relative thicknesses, as shown in FIG. 2, bear no correlation to any particular characteristic. Nor are the layers 202, 204 and their relative thicknesses necessarily drawn to scale, and therefore should not be considered limiting of the present disclosure. Moreover, those skilled in the art will readily recognize that the materials that make up each layer 202, 204 (i.e., Si and $SiO_2$) may vary, depending on the application, cost of materials, and/or applicability of the material to the given substance being analyzed.

In some embodiments, the material of each layer 202, 204 may be doped or two or more materials may be combined in a manner to achieve the desired optical characteristic. In addition to solids, the exemplary ICE 100 may also contain liquids and/or gases, optionally in combination with solids, in order to produce a desired optical characteristic. In the case of gases and liquids, the ICE 100 may contain a corresponding vessel (not shown), which houses the gases or liquids. Exemplary variations of the ICE 100 may also include holographic optical elements, gratings, piezoelectric, light pipe, and/or acousto-optic elements, for example, that may create transmission, reflection, and/or absorptive properties of interest.

Multiple layers 202, 204 exhibit different refractive indices. By properly selecting the materials of the layers 202, 204 and their relative thickness and spacing, the ICE 100 may be configured to selectively pass/reflect/refract predetermined fractions of electromagnetic radiation at different wavelengths. Each wavelength is given a predetermined weighting or loading factor. The thickness and spacing of the layers 202, 204 may be determined using a variety of approximation methods from the spectrum of the characteristic or analyte of interest. These methods may include inverse Fourier transform (IFT) of the optical transmission spectrum and structuring the ICE 100 as the physical representation of the IFT. The approximations convert the IFT into a structure based on known materials with constant refractive indices.

The weightings that the layers 202, 204 of the ICE 100 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. The ICE 100 may be configured to perform the dot product of the electromagnetic radiation received by the ICE 100 and the wavelength dependent transmission function of the ICE 100. The wavelength dependent transmission function of the ICE 100 is dependent on the layer material refractive index, the number of layers 202, 204 and the layer thicknesses. The ICE 100 transmission function is then analogous to a desired vector derived from the solution to a linear multivariate problem targeting a specific component of the sample being analyzed. As a result, the output light intensity of the ICE 100 is related to the characteristic or analyte of interest. The desired vector derived from the solution to a linear multivariate problem may be any one of a regression vector, a loading vector, or a plurality of loading vectors derived from a linear combination of more than one regression vector. Accordingly, in some embodiments ICE 100 may include alternating layers of a first (e.g., Si and the like) and a second (e.g., $SiO_2$, and the like) dielectric material. Each of the alternating layers of the first and the second dielectric materials have a thickness and a refractive index selected according to a regression vector associated with a characteristic of a sample.

Optical computing devices employing ICE 100 may be capable of extracting the information of the spectral fingerprint of multiple characteristics or analytes within a substance and converting that information into a detectable output regarding the overall properties of the substance. That is, through suitable configurations of the optical computing devices, electromagnetic radiation associated with characteristics or analytes of interest in a substance may be separated from electromagnetic radiation associated with all other components of the substance in order to estimate the properties of the substance in real-time or near real-time. Accordingly, ICE 100 is able to distinguish and process electromagnetic radiation related to a characteristic or analyte of interest.

Before ICE 100 is physically fabricated, one or more ICE models are typically generated. Such models may be generated using, for example, a computer-based software program or design suite that may be stored on a computer-readable medium containing program instructions configured to be executed by one or more processors of a computer system. The design suite may be configured to generate several ICE device models, each being configured or otherwise adapted to detect a particular characteristic or analyte of interest.

Figure 5:
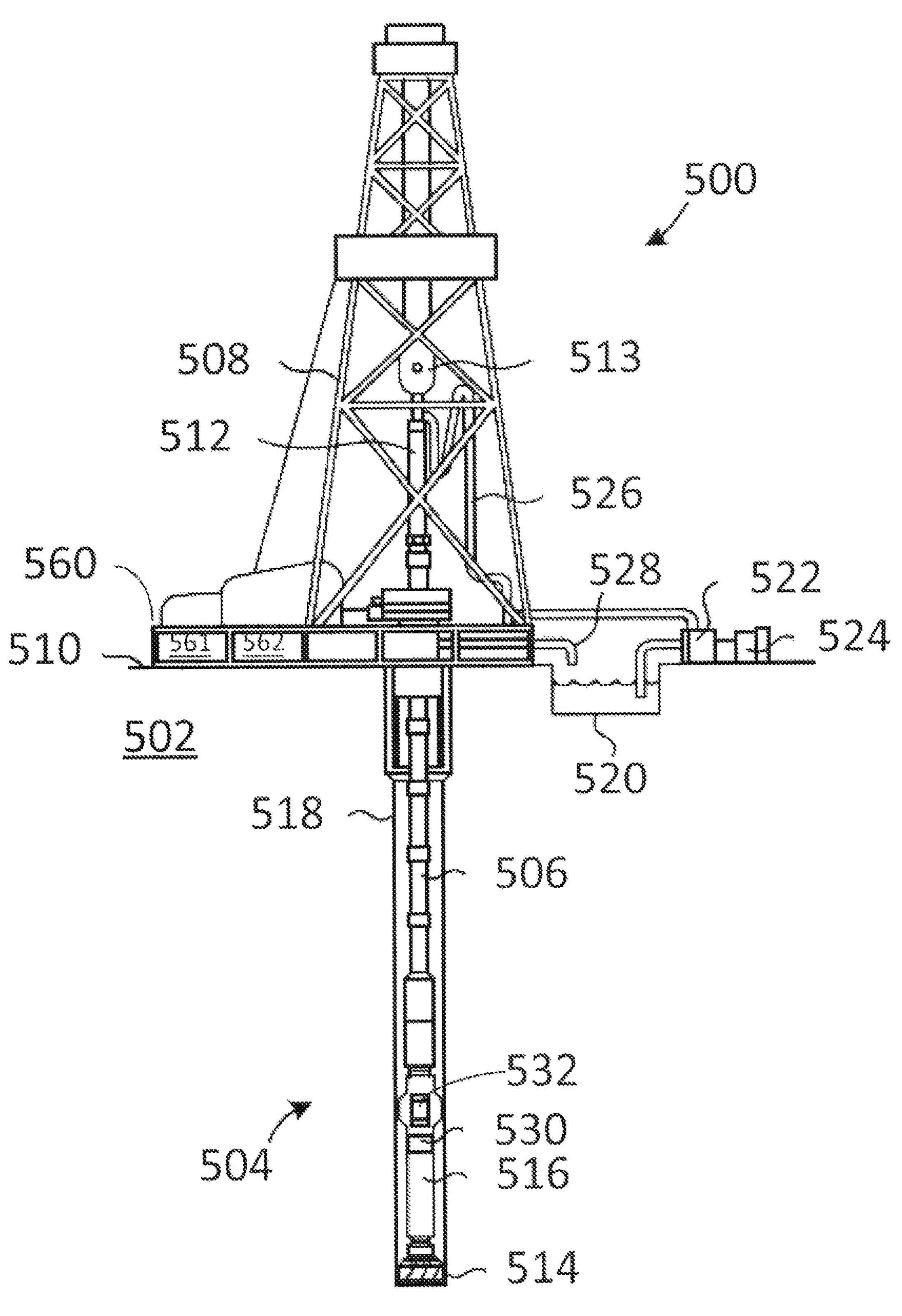
FIG. 5 illustrates a drilling system configured with a downhole tool configured having an optical sensor including an optical computing device in a measurement-while-drilling (MWD) and a logging-while-drilling (LWD) operation.

FIG. 5 illustrates a drilling system 500 configured with at least one tool having a sensor including but not limited to an optical computing device 532 (e.g., optical computing device 20) in a measurement-while-drilling (MWD) or logging-while-drilling (LWD) operation. Boreholes may be created by drilling into the earth 502 using drilling system 500. Drilling system 500 may be configured to drive a bottom hole assembly (BHA) 504 positioned or otherwise arranged at the bottom of a drill string 506 extended into the earth 502 from a derrick 508 arranged at the surface 510. The derrick 508 includes a Kelly 512 and a traveling block 513 used to lower and raise the Kelly 512 and the drill string 506.

The BHA 504 may include a drill tool 514 operatively coupled to a tool string 516 which may be moved axially within a drilled wellbore 518 as attached to the tool string 516. During operation, drill tool 514 penetrates the earth 502 and thereby creates wellbore 518. BHA 504 provides directional control of drill tool 514 as it advances into earth 502. Tool string 516 may be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within drill string 506, as shown in FIG. 5.

Fluid or "drilling mud" from a mud tank 520 may be pumped downhole using a mud pump 522 powered by an adjacent power source, such as a prime mover or motor 524. The drilling mud may be pumped from mud tank 520, through a stand pipe 526, which feeds the drilling mud into drill string 506 and conveys the same to drill tool 514. The drilling mud exits one or more nozzles arranged in drill tool 514 and in the process cools drill tool 514. After exiting drill tool 514, the mud circulates back to the surface 510 via the annulus defined between the wellbore 518 and the drill string 506, and in the process returns drill cuttings and debris to the surface. The cuttings and mud mixture are passed through a flow line 528 and are processed such that a cleaned mud is returned down hole through the stand pipe 526 once again.

BHA 504 may further include a downhole tool 530. For this embodiment, downhole tool 530 includes optical computing device 532 configured with one or more ICE 100. Downhole tool 530 may be positioned between drill string 506 and drill tool 514.

A controller 560 including a processor 561 and a memory 562 may be communicatively coupled to optical computing device 532 of downhole tool 530. While optical computing device 532 may be placed near the bottom of wellbore 518, and extend for a few inches above drill tool 514, a communication channel may be established by using electrical signals or mud pulse telemetry for most of the length of tool string 506 from drill tool 514 to controller 560. In certain embodiments, optical computing device 532 may obtain real time measurements of an amount of an interactive component of the fluid downhole, and real time measurements of an amount of a non-interactive component of the fluid downhole. In addition, drilling system 500 may be configured with one or more additional tools to obtain real time property measurements of a fluid comprising a formation fluid downhole.

Memory 562 includes commands which, when executed by processor 561 cause controller 560 to perform steps in methods consistent with the present disclosure. More specifically, controller 560 may provide commands to and receive data from optical computing device 532 during operation. For example, in some embodiments, controller 560 may receive information from optical computing device 532 about drilling conditions in wellbore 518 and controller 560 may provide a command to BHA 504 to modify certain drilling parameters. For example, controller 560 may provide a command to adjust or change the drilling direction of drill tool 514 based on a message contained in information provided by optical computing device 532. In that regard, the information provided by optical computing device 532 to controller 560 may include certain drilling conditions such as physical or chemical properties of the drilling mud in the subterranean environment. More generally, optical computing device 532 may provide data such as gas-oil-ratio (GOR) content, a methane concentration, a $CO_2$ concentration, or a hydrocarbon content of a fluid in the borehole. Accordingly, controller 560 may use processor 561 to determine a characteristic of the sample in a medium surrounding drill tool 514 using the data collected from the optical computing device 532.

Figure 6:
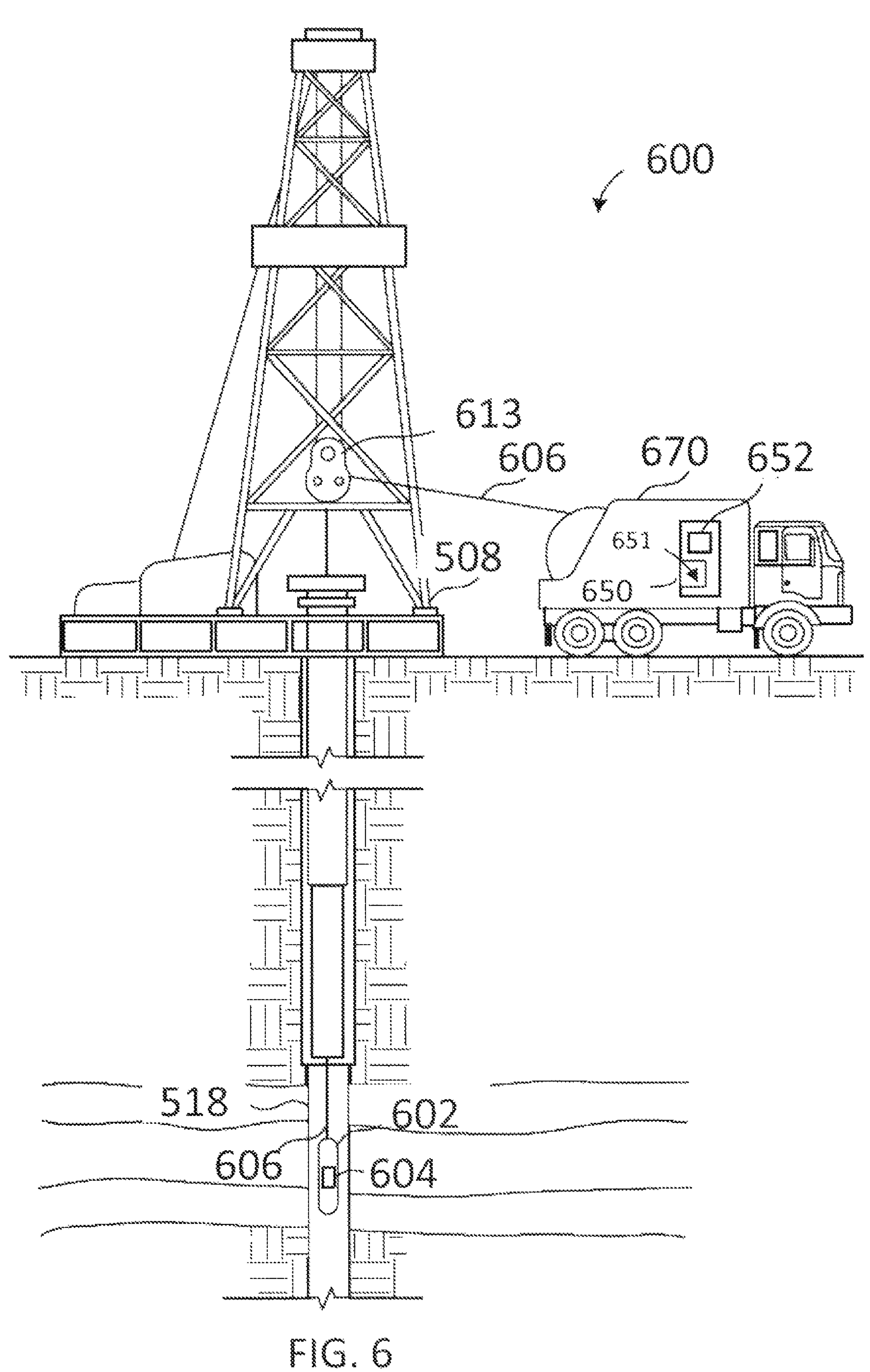
FIG. 6 illustrates a wireline system configured with a downhole tool having an optical sensor including an optical computing device during formation testing and sampling.

FIG. 6 illustrates a wireline system 600 configured with a tool having a sensor including but not limited to an optical computing device 604 during formation testing and sampling. After drilling of wellbore 518 is complete, it may be desirable to know more details of types of formation fluids and the associated characteristics through sampling with use of wireline formation tester. System 600 may include a wireline tool 602 that forms part of a wireline logging operation that may include one or more of an optical computing device 604 as described herein (e.g., optical computing device 20 or 532). System 600 may include derrick 508 supporting traveling block 613. Wireline tool 602, such as a probe or sonde, may be lowered by wireline or logging cable 606 into wellbore 518. Wireline tool 602 may be lowered to the bottom of the region of interest and subsequently pulled upward at a substantially constant speed by wireline or logging cable 606. Wireline tool 602 may be configured to measure fluid properties of the wellbore fluids, and any measurement data generated by wireline tool 602 and its associated optical computing device(s) 604 may be communicated to a surface logging facility 670 for storage, processing, and/or analysis. The optical computing device(s) 604 may include one or more ICE 100. Logging facility 670 may be provided with electronic equipment 650, including one or more processors 651 and one or more memory 652 for various types of signal processing. Memory 652 may store instructions and commands which, when executed by processor 651, may provide determinations and fluid characterization as disclosed herein.

At least some of the steps in the methods described herein may be performed by a computer having a processor executing commands stored in a memory of the computer.

Some embodiments of this application relate to a system, e.g., a drilling system or logging system. The system comprises one or more tools such as one or more downhole tools or one or more logging tools which comprise one or more optical computing devices. The one or more tools may be configured to obtain real time property measurements of a fluid comprising a formation fluid downhole, real time measurements of an amount of an interactive component of the fluid downhole, and/or real time measurements of an amount of a non-interactive component of the fluid downhole. The system may also comprise a memory storing instructions, and at least one processor that executes the instructions to: determine the total amount of the interactive component or a contamination level of the formation fluid at a time of interest based on the real time property measurements of the fluid downhole and the real time measurements of the amounts of the interactive component and non-interactive component downhole, wherein the real time measurements of the amount of the interactive component downhole are real time measurements of the amount of the interactive component in its free form downhole, wherein the property is scaled with the contamination level.

Some embodiments of this application relate to a non-transitory, computer-readable storage medium including instructions which, when executed by a processor cause a computer to perform a method, the method comprising: receiving real time property measurements of a fluid comprising a formation fluid downhole, receiving real time measurements of an amount of an interactive component of the fluid downhole, receiving real time measurements of an amount of a non-interactive component of the fluid downhole, and determining the total amount of the interactive component or a contamination level of the formation fluid at a time of interest based on the real time property measurements of the fluid downhole and the real time measurements of the amounts of the interactive component and non-interactive component downhole, wherein the real time measurements of the amount of the interactive component downhole are real time measurements of the amount of the interactive component in its free form downhole, wherein the property is scaled with the contamination level.

As used herein, a non-interactive component refers to any compound in a formation fluid that does not interact with drilling fluid or mud such as by forming covalent or noncovalent bonds with other components of the drilling fluid or mud. In other words, the non-interactive component exits in its free form in a formation fluid without preferential influence from any drilling fluid component. Typical examples of such non-interactive components for common drilling fluids include $C_1$-$C_5$ alkanes, such as methane, ethane, propane, etc., although specific drilling fluid chemistries may make specific formation fluid components either interactive or non-interactive in different circumstances.

As used herein, an interactive component refers to any compound in a formation fluid that interacts with drilling fluid or mud such as by forming covalent or noncovalent bonds with other components of the drilling fluid or mud. This interaction leads to a chemical entity that does not respond to a signal, e.g., an optical signal, tuned to the interactive component when it is not interacting with certain other components, e.g., in its free form, present in drilling fluid or mud. The free form of the interactive component may be released when the drilling fluid filtrate contamination level is less than an amount required to interact with substantially the total amount of the interactive component. Theoretically, the drilling fluid filtrate contamination level required to interact with the total amount of the interactive component is also the drilling fluid filtrate contamination level when the release of the interactive component in its free form (or unbound form) begins to occur. Typical examples of the interactive components for common drilling fluids include $CO_2$ and $H_2S$.

The phrases "total amount of the interactive component" and "actual amount of the interactive compound" are used interchangeably in this application. Both refer to the addition of the amount of the interactive compound in its free form and the amount of the interactive compound in its bound form.

The term "property" in the phrase "real time property measurement of a fluid" refers to the property of the fluid that is scaled with the contamination level. It may be the density or GOR of the fluid. It may also be the amount of any non-interactive component, which may be the same as or different from non-interactive component recited in the method.

The term "concentration" and "amount" for the interactive component and non-interactive component are used interchangeably.

Use of brackets for components refers to amounts or concentrations of such components. For example, use of brackets for [$CO_2$], [C1], [an interactive component], and [a non-interactive component] or something similar refer to the downhole measured amounts or concentrations of $CO_2$, methane, the interactive component, and the non-interactive component, respectively. $[CO_2]_R$, $[C1]_R$, $[\text{an interactive component}]_R$, and $[\text{a non-interactive component}]_R$ or something similar refer to the actual amounts or actual concentrations of $CO_2$, methane (i.e., the amount of methane corrected for dilution factor caused by the contamination), the interactive component, and the non-interactive component (i.e., the amount of non-interactive component corrected for dilution factor caused by the contamination), respectively.

In the application, the term "unbound" or "free form" may be used interchangeably. Both terms refer to a compound itself without forming a chemical entity that does not respond to an optical signal tuned to the compound in its free form. The term "bound form" refer to a compound forming a chemical entity with drilling fluid filtrate that does not respond to an optical signal tuned to the compound in its free form.

In implementing certain aspects of the application, drilling fluid is used in a wellbore. Drilling fluid filtrate is caustic, containing multiple oil or water soluble basic compounds designed to scavenge acidic compounds such as hydrogen sulfide ($H_2S$) or carbon dioxide from the formation fluid. The drilling fluid may contain water soluble and/or oil soluble acid scavenging compounds to reduce corrosion and bind with $H_2S$. These scavengers are very often but not limited to amine components. Amines (nitrogen containing compounds) are also used for $CO_2$ capture during combustion. This process is well documented in the literature. The scavenging process involves interactions between scavenger, such as an amine, and the component to be scavenged, such as $H_2S$ or $CO_2$. More generally, any caustic or Lewis base components in a mixture will interact with acetic or Lewis acid components. The interaction may be a non-covalent reaction or covalent reaction, or any other type reaction that allows the scavenged component, such as $CO_2$ or $H_2S$, to be released in its free form, upon the drilling fluid contamination is less than the amount required to interact with the total amount of the component to be scavenged, such as $H_2S$ or $CO_2$. Although amine chemistry is not the only scavenging chemistry available, it is common because it may also provide favorable conditioning to subterranean formations.

The minimum drilling fluid filtrate level required to completely bind the interactive component is termed as break through level.

Interactive components also may be scavenged by a tool body. The competitive mechanism for binding with the mud filtrate may be used to optimize the concentration of drilling fluid filtrate wherein the filtrate level is chosen not to be as low as possible, but rather sufficiently close to the break through contamination level. Further, multiple samples may be acquired after the break through level to characterize multiple components of the reactive component. If the reactive component binds with the filtrate component, then it may be protected against scavenging from the tool, thereby allowing a sample to be captured. Further with previous from analog wells or general experience characterization, a sampling decision on a new well may be conducted to optimize the level of contamination in a sample to preserve the reactive component and protect from tool or sampling scavenging. For example, when the interactive component is hydrogen sulfide, to avoid pollution, the sampling is expected to be performed before the break through level. In other words, a sampling decision is made based on the amount of the interactive component.

Figure 3A:
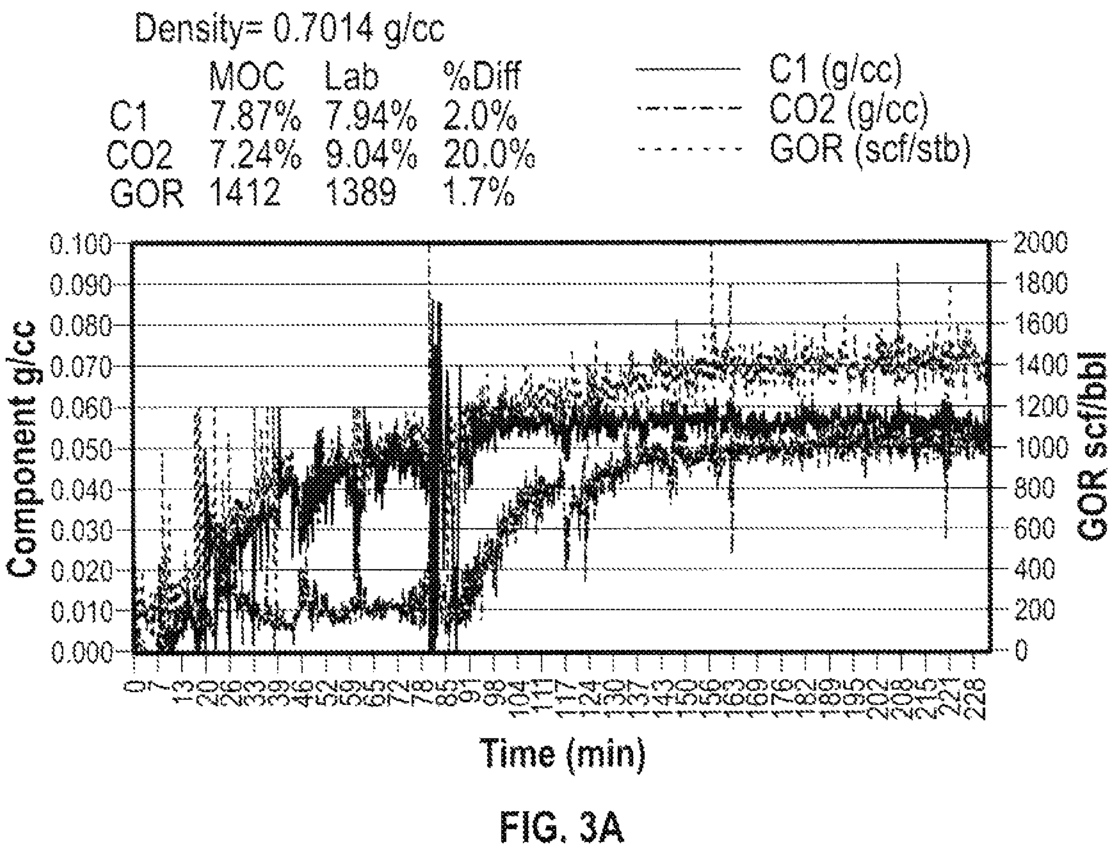
FIG. 3A shows downhole real time measurements of the amounts of $CO_2$, methane (C1), and gas-oil ratio (GOR) in a fluid comprising a formation fluid flowing through sensors.

FIG. 3A shows a plot of real time concentration measurements for $CO_2$, methane (denoted as C1) and gas-oil ratio (GOR) from a pumpout fluid over time. In some embodiments, the value of the ordinate (Y-axis) in the plot depicted in FIG. 3A is a signal generated by a detector from an optical computing device as disclosed herein (e.g., signal 170 from detector 110 in optical computing device 20, cf. FIG. 1). The measurements were obtained by using optical computing devices consistent with the present disclosure (e.g., optical computing devices 20, 532, and 604) in downhole measurements by flowing the pump out fluid through the sensors. The optical computing devices use at least one ICE tuned to measure free, unbound $CO_2$ in the pump out fluid. The optical signals of bound $CO_2$ significantly differ from those of un-bound $CO_2$. Accordingly, the optical computing device is not expected to respond to bound $CO_2$.

The real time plot of the concentration of free $CO_2$ may be characterized as comprising three phases, which include an initial low steady concentration followed by a phase showing a sharp increase in the concentration of free $CO_2$ followed by a plateau concentration phase. For this embodiment, the amount of free $CO_2$ begins to rise sharply in FIG. 3A at 91 minutes when the drilling fluid filtrate contamination level decreased to the amount required to complex the total amount of $CO_2$.

As used herein, the phrase "the time when the release of the interactive components in its free form begins to occur" or similar language refers to the time point on the real time plot of the amount of the interactive component when the amount of the interactive components in its free form begins to rise more sharply than the previous phase. In theory, it is the time when the drilling fluid filtration contamination in the formation fluid is at a level required to interact with the total amount of the interactive component such that no free interactive component exists. This contamination level is termed as "B" in this application or break through contamination level. Before and after this time, the drilling fluid filtration contamination level in the formation fluid is greater and lower than B, respectively.

It is believed that in the phase before 91 minutes, amines (and/or other acid scavengers) in the drilling fluid filtrate or mud contamination were complexing (loosely binding in a non-covalent fashion) with the $CO_2$, thereby suppressing the signal for unbound $CO_2$ until the drilling fluid filtrate or mud concentration—and consequently the amine concentration—was sufficiently low to allow free $CO_2$ to be released. The $CO_2$ concentration began to rise immediately after 91 minutes, corresponding with a decrease in the drilling fluid filtrate or mud associated scavengers such that free, unbound $CO_2$ could be present and detected.

Compared to the laboratory determined concentration of $CO_2$ in the sample represented by FIG. 3A, the $CO_2$ determined by the optical computing device downhole was 1.8 percentage units lower than the laboratory determination (9.04% versus 7.24%), resulting in a relative 20% difference in concentration. However, according to laboratory analysis, the fluid that was sampled contained 3.22% wt drilling fluid filtrate or mud contamination.

During laboratory analysis, the complexing of $CO_2$ with amines in the drilling fluid filtrate or mud would have been reversed and free, unbound $CO_2$ released immediately when the sample was flashed to lower pressure. Therefore, the laboratory would observe all $CO_2$ whether previously bound or free. The laboratory determination of 9.04% wt $CO_2$ in the formation fluid was a true representation of the total $CO_2$ concentration in the contaminated formation fluid. The optical computing device measured the contaminated formation fluid downhole, where high pressure facilitated complexing reactions. Therefore, the $CO_2$ result of 7.24% wt obtained using an optical computing device downhole represented only the unbound or free $CO_2$ present in the contaminated formation fluid.

From the laboratory reported contamination of formation fluid sampled at different times, the pumpout optical computing device data could be scaled to determine a 15% wt contamination at the time when free $CO_2$ in the formation fluid began to release (i.e., at 91 minutes in FIG. 3). Therefore, optical computing device predicted 0% wt free $CO_2$ with 15% contamination. Free $CO_2$ began to rise immediately after the contamination dropped below 15%. The contamination level of 15% wt was the amount of drilling fluid filtrate to complex with the total amount of $CO_2$ present in the formation fluid. A simple ratio (3.2%/15%) determines that at 3.2% wt contamination, 20% of the $CO_2$ would be complexed and 80% of the $CO_2$ would be free downhole.

Therefore, the downhole response of the optical computing device (7.24 wt %) was only 80% of the total $CO_2$ concentration. Correcting the downhole response of the optical computing device for complexing yields a total $CO_2$ concentration in the formation fluid of 9.09 wt %. That means, the actual amount of $CO_2$ (9.09 wt %) is equal to the measured amount of $CO_2$ (7.24 wt %) divided by the result of (1−3.2%/15%).

The corrected downhole $CO_2$ response of the optical computing device was only 1% higher than the laboratory determination (9.04% wt). This correction did not account for the dilution factor of drilling fluid filtrate to correct the reservoir concentration. The uncontaminated reservoir fluid concentration may be calculated to correct for dilution of $CO_2$ as 9.09/(1−3.2%/100%)=9.37% wt $CO_2$.

The above validates a method of determining the actual amount of $CO_2$ in the formation fluid (termed as "$[CO_2]_R$") based on the real time amount of $CO_2$ measured downhole (termed as $[CO_2]$). This method comprises determination of drilling fluid filtrate contamination levels of the formation fluid at different times. The contamination level at the time when the release of free $CO_2$ begins to occur (termed as "B") and at the time of interest which is after the time when the release of free $CO_2$ occurs (termed as "C") may be determined. Both B and C may be expressed as a number of contamination percent.

The relationship of $[CO_2]$ obtained by downhole measurements to $[CO_2]_R$, B, and C may be expressed in Equation 1 set forth below (C< or =B):

$$[CO_2]=[CO_2]_R(1-C/B) \quad \text{Equation 1}$$

Figure 3B:
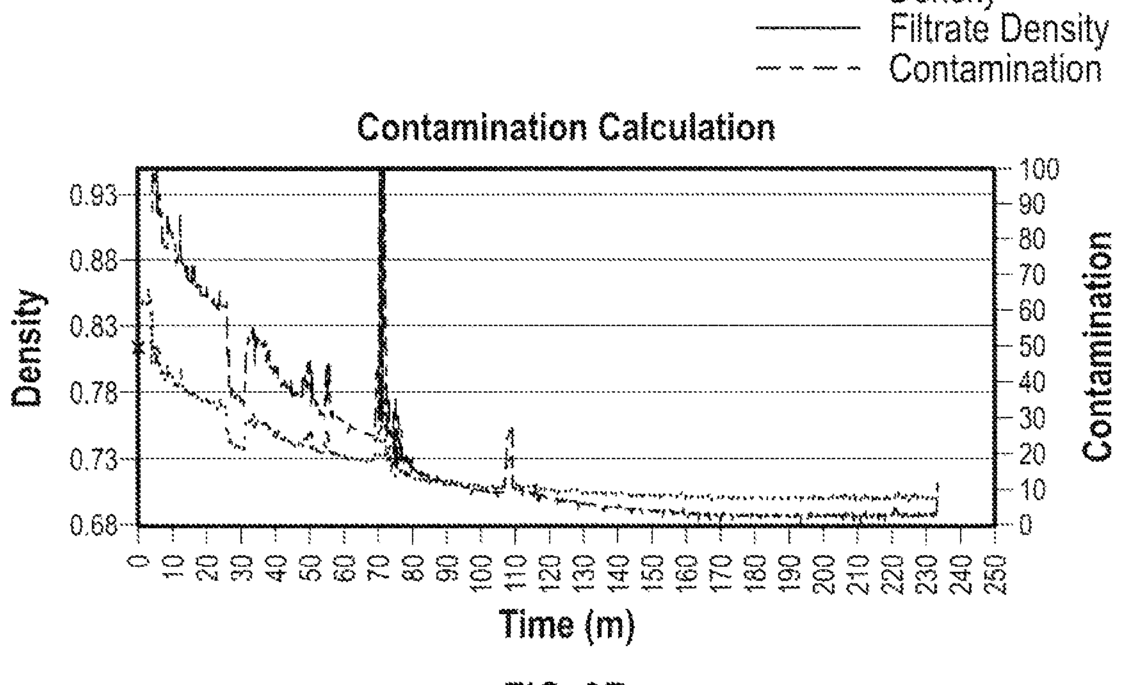
FIG. 3B shows downhole real time measurements of density of the fluid flowing through sensors.

FIG. 3B shows real time density measurements of the fluid during the same pumpout as FIG. 3A. In some embodiments, the value of the ordinate (Y-axis) in the plot depicted in FIG. 3B is a signal generated by a detector from an optical computing device as disclosed herein (e.g., signal 170 from detector 110 in optical computing device 20, cf. FIG. 1). In FIG. 3B, the density of the fluid pumpout, as shown on the left axis, graded approximately linearly from drilling fluid filtrate at early times to formation fluid at late times. During very early times, drilling fluid (mud) was actually pumped through the optical computing device as opposed to the drilling fluid filtrate. The drilling fluid had a much higher density than drilling fluid filtrate. As mud cleared the tool line, the density of the pumped fluid shifted down to the density of pure drilling fluid filtrate. A density of 0.815 g/cc for drilling fluid filtrate, $\rho_F$, could be estimated at early times by extrapolating the density response back to the origin. That means, the density of the drilling fluid filtrate is the density of the pumpout fluid extrapolated to time 0 on the real time density measurements of the pumpout fluid downhole, which correspond to 100% contamination.

Using an average of the ending fluid density $\rho_E$ in the plot of FIG. 3B as 0.70155 g/cc, for which a laboratory drilling fluid filtrate contamination of 3.22% wt was measured, the density of the pure formation fluid $\rho_R$ could be calculated as: $(3.22/100)\rho_F+(1-3.22/100)\rho_R=\rho_E$ so that $\rho_R$ was 0.6978 g/cc. The contamination curve shown on the right axis of FIG. 3B may be calculated by the method described below.

This application further relates to a method of determining the drilling fluid filtrate contamination of the formation fluid. This method further uses both real time, in situ or post processed measurements of an interactive component of the formation fluid and real time measurements of a non-interactive component of the formation fluid. The method further provides information of the amounts of the interactive component and the non-interactive amount for in real time or in situ actions including sampling decision actions. This method may further use physical fluid property measurements such as density measurements of the pumpout fluid downhole.

In some embodiments, the method comprises determination of a value for B and a value for C using asymptotic assumptions.

By way of a non-limiting example, the interactive component may be $CO_2$ or $H_2S$. The non-interactive component may be a $C_1$-$C_5$ alkane e.g., methane, ethane, propane, etc.

Any sensor response linear with contamination may be scaled to a contamination calibration curve with two known points of contamination. In fact for some sensor responses, the 100% drilling fluid filtrate point is known a-priori. Such is the case including but not limited to gas concentration, where it is assumed that drilling fluid filtrate contains no dissolved gas. For example a methane concentration should then be zero at 100% drilling fluid filtrate.

Other sensor responses which may be characterized at 100% drilling fluid filtrate contamination include but not limited to drilling fluid filtrate density. Of greater difficulty is obtaining a secondary signal from which to calibrate a contamination curve. Contamination trend fitting assumes the monotonic decrease of contamination throughout the process of a near wellbore flush by a wireline formation tester pumpout. The trend fitting models assume an asymptotic approach to pure formation fluid.

The second calibration point may be derived as the asymptote of the trend fit model. In fact, nonlinear responses may also be fit if the response function for the sensor measurement is known as a function of contamination. Such is the case with gas to oil ratio GOR, viscosity, or NMR signals. As an example, one method to use nonlinear signals to calculate contamination is to linearize the signals according to the known response function. As another example, a second method is to fit contamination according to a nonlinear model. Unfortunately, the assumption that contamination asymptotically approaches zero often proves to be false, and instead the contamination approaches a steady state value either influenced by far field contamination or drilling fluid filtrate recycle from the wellbore. Also, often the models used to fit contamination are not sufficient to extrapolate the nuances of real data. The contamination level B at the time when release of free $CO_2$ occurs may serve as a secondary point for a real time calibration of a contamination curve.

The method of determining the drilling fluid filtrate contamination level of the formation fluid is described below by using $CO_2$ as the interactive component and methane as non-interactive component and the real time measurements illustrated in FIG. 3A and FIG. 3B, without limiting the scope thereof.

The real time amount of methane obtained by downhole measurements (termed as $[C1]$), the actual amount of methane (termed as $[C1]_R$), which refers to the methane amount corrected for dilution factor caused by the contamination, and C, which is the contamination percent at the time of interest which is after the time when the release of free $CO_2$ occurs, may be represented in Equation 2 set forth below:

$$[C1]=[C1]_R\left(1-\frac{C}{100}\right) \quad \text{Equation 2}$$

A plot of the real time $[CO_2]$ versus corresponding real time $[C1]$ is linear with slope related to B. "Corresponding" means $[C1]$ measured at the same time as $[CO_2]$. Using a two point slope (m) calculation, Equation 3 set forth below may be used to calculate m, where:

$$m=\frac{[CO_2]_R(1-C_2/B)-[CO_2]_R(1-C_1/B)}{[C1]_R(1-C_2/100)-[C1]_R(1-C_1/100)} \quad \text{Equation 3}$$

In Equation 3, $C_1$ and $C_2$ are contaminations at two different time points in the fluid pumpout, respectively. When the earlier time point is the time point when the release of free $CO_2$ occurs (for example, at 91 minutes in FIG. 3), C1=B, and Equation 3 may be simplified to Equation 4 set forth below:

$$m = \frac{[CO_2]_R(1 - C_2/B)}{[C1]_R(1 - C_2/100) - [C1]_R(1 - B/100)} \quad \text{Equation 4}$$

Equation 4 may be simplified into Equation 5, defining $[CO_2]_R/[C1]_R$=k and rearranging the denominator:

$$m = k\frac{(1 - C_2/B)}{(1 - 1 + (B - C_2)/100)} \quad \text{Equation 5}$$

Equation 5 may be simplified into Equation 6 or Equation 7 by removing 1-1 and unifying the numerator:

$$m = k(\frac{(B - C_2)/B}{(B - C_2)/100}) \quad \text{Equation 6}$$

$$m = k\frac{100}{B} \quad \text{Equation 7}$$

Equation 7 may be rearranged into Equation 8:

$$B = k\frac{100}{m} \quad \text{Equation 8}$$

Using the linear equation $[CO_2]$=[C1]m+b, where b is the pumpout determined intercept, Equation 9 may be derived:

$$k = \frac{b}{[C1]_R} + m \quad \text{Equation 9}$$

At the time when C=B, Equation 2 may be rewritten as Equation 10:

$$[C1] = [C1]_R\left(1 - \frac{B}{100}\right). \quad \text{Equation 10}$$

Unfortunately for the example of FIG. 3, the intercept at C1=0 occurring at 100% contamination which is far from B of ~15% as estimated from lab data. Although mathematically the slope and intercept may be used to derive B, in this case the intercept would have too much error, so B is instead estimated by iteration.

In conducting iteration, m may be calculated from two time points in FIG. 3A, each time point corresponding to a set of $[CO_2]$ and [C1]. For example, at time 91 and 111 minutes in FIG. 3A, each of [C1] and $[CO_2]$ was found to be:

| | [C1] (weight fraction conversion, i.e., concentration divided by the density) | $[CO_2]$ (weight fraction, i.e., concentration divided by the density) |
|---|---|---|
| T2 = 111 minutes | 0.0805 | 0.0537 |
| T1 = 91 minutes | 0.0752 | 0.0127 |

The slope m is (0.0537-0.0127)/(0.0805-0.0752) = 7.74.

$[CO_2]_R$ and $[C1]_R$ may be calculated with an asymptotic approach. This approach is reflected in FIG. 4. It begins with a set of $[CO_2]$ and [C1] measured at time 1 (labeled as $[CO_2]_{time1}$ and $[C1]_{time1}$, respectively), which is, for example, after the inflection point of $CO_2$ rise of real time measurements, which may be approximated by 50% of the asymptotic $CO_2$ value, such as measurements of amount of $CO_2$ and methane at 228 minutes as reflected in FIG. 3A. Treating this set of $[CO_2]_{time1}$ and $[C1]_{time1}$ as the first set of $[CO_2]_R$ and $[C1]_R$, thereby obtaining a k value which is equal to $[CO_2]_{time1}/[C1]_{time1}$, labeled as k1. According to Equation 8, B=k*100/m, a B value labeled as B1 may be obtained as B1=k1*100/m.

Based on the real time density measurements chart of the pumpout fluid as exemplified in FIG. 3B, the density for the drilling fluid filtrate when the contamination is 100% may be obtained by extrapolation. B1 represents the contamination at the time when the release of free $CO_2$ begins to occur, wherein the corresponding density may be found in the real time density measurements chart (the time is 91 minutes in FIG. 3B). Hence, using linear fitting based on the density and contamination value at the two time points (i.e., time 0 when contamination is 100% wherein the density is obtained by extrapolation of the density plot of FIG. 3B, and the time when the contamination is B1 wherein the density may be found at the time when release of free $CO_2$ begins to occur in the density plot of FIG. 3B, this time may be found in FIG. 3A) and the density measured at time 1, a first value for the contamination C at time 1, labeled China, may be obtained.

Applying the calculated B1 and $C_{time1}$, and the measured $[CO_2]_{time1}$ into Equation 1, and the calculated B1 and $C_{time1}$, and the measured $[C1]_{time1}$ and Equation 2, a second set of $[CO_2]_R$ and $[C1]_R$ may be obtained. So is the second value for k (labelled as k2). Using the same slope m, a second value for B (labelled as B2) is obtained. Repeating the density linear fitting, a second value for the contamination C at time 1 may be obtained. Repeating the calculations until each of the $[CO_2]_R$ and $[C1]_R$ approach asymptotic limit.

The final round of calculation comprises using the asymptotic limit of the $[CO_2]_R$ and $[C1]_R$ to obtain k, and then B, using the density linear fitting to obtain C at time 1.

Figure 4:
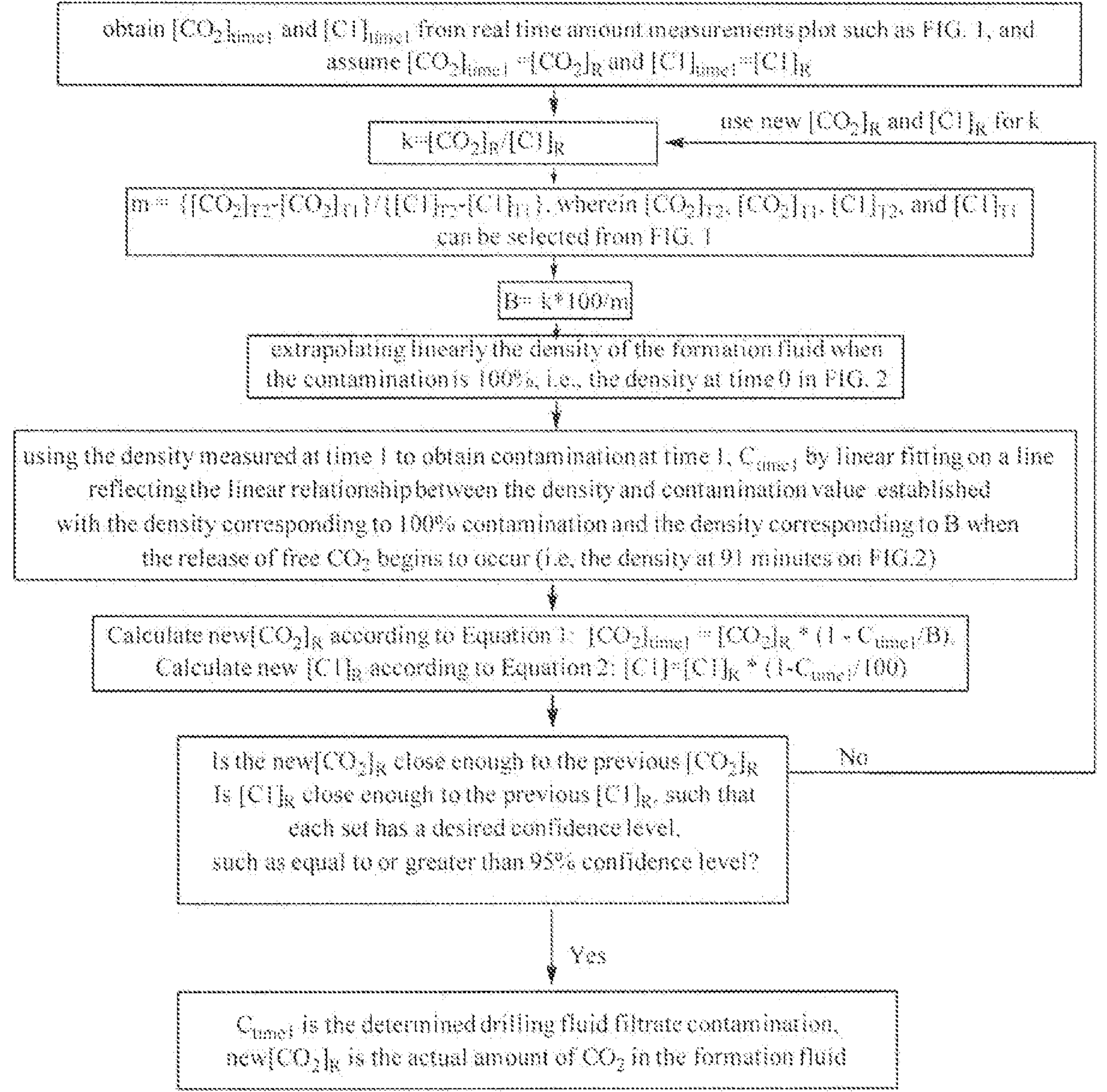
FIG. 4 is a flow chart illustrating an asymptotic approach for obtaining a drilling fluid filtrate contamination and total amount of an interactive component (such as $CO_2$).

The above method compared well with C value obtained in laboratory. For example, the asymptotic limit of the $[CO_2]_R$ and $[C1]_R$ obtained using measurements reflected in FIG. 3A and FIG. 3B and the method described in FIG. 4 are 0.0650 g/cc and 0.0572 g/cc, respectively. The k value therefore is 0.0650/0.0572=1.1304, which leads to B=100*k/m=14.61%. From FIG. 3B, the density for the drilling fluid filtrate is 0.815 by extrapolation (at 100% contamination). B is the contamination at the time when the release of free $CO_2$ begins to occur, which is at 91 minutes according to FIG. 3A. In FIG. 3B, the density at 91 minutes is 0.71452. Using the density linear fitting based on the following two points,

| | density | contamination |
|---|---|---|
| initial | 0.815 | 100 |
| At time 91 minutes | 0.71452 | 14.61249 |

the contamination at 228 minutes which corresponds to a density of 0.70155 on FIG. 3B may be obtained as 3.590632 by linear fitting using the line determined by the two time points (time 0 and 91 minutes, described in the above table). Comparing with the laboratory value of 3.22%, the calculated value of 3.59 is reliable. Density is used in the examples for linear fitting. Other properties of the pumpout fluid which are scaled with contamination level may also be used for linear fitting. Exemplary properties include GOR of the pumpout fluid and the amount of a non-interactive component of the pumpout fluid.

The methods described herein use $CO_2$ as the example of interactive component and methane as the example of non-interactive component for determining the drilling fluid filtrate contamination and the actual amount of $CO_2$. The methods are not limited to $CO_2$ and methane. The real time measurements of other interactive components and non-interactive components may be used to determine the drilling fluid filtrate contamination and the actual amount of the interactive component. $[CO_2]$ and [C1] used in the methods described herein may be replaced with [an interactive component] and [a non-interactive component], respectively.

At least some of the steps described in FIG. 4 may be performed by a computer having a processor executing commands stored in a memory of the computer. Specifically, some embodiments of this application relate to a system, comprising memory storing instructions and data, and at least one processor that executes the instructions, the instructions and data comprising: receive real time amount measurements of C1 and $CO_2$ at time1 and obtain k as $[CO_2]/[C1]$; determine B which is equal to k*100/m, wherein m is equal to the ratio of the difference of real time measurements of $[CO_2]$ at two time points over the difference of real time measurements of [C1] at the corresponding two time points; determine the contamination at time1 ($C_{time1}$) by linear fitting on a line determined by time zero wherein contamination is 100% and density is the extrapolated value of the real time density chart and by the time when the release of free $CO_2$ begins to occur wherein contamination is B and density is found on the real time density chart; determine $[CO_2]_R$ and $[C1]_R$ according to Equation 1 and 2, respectively; determine whether $[CO_2]_R$ and $[C1]_R$ are equal to or greater than a certain confidence level, such as 95% confidence level, comparing to $[CO_2]$ and [C1], respectively. In some embodiments, the instructions further comprise: output $C_{time1}$ as the contamination at time 1, and $[CO_2]_R$ as the actual amount of $CO_2$ in the formation fluid if the confidence level is satisfied; determine k as $[CO_2]_R/[C1]_R$ and repeat the steps beginning from the determination of B if the confidence level is not satisfied.

Some embodiments of this application relate to a non-transitory, computer-readable storage medium including instructions which, when executed by a processor cause a computer to perform a method. The method comprising: receive real time amount measurements of C1 and $CO_2$ at time1 and obtain k as $[CO_2]/[C1]$; determine B which is equal to k*100/m, wherein m is equal to the ratio of the difference of real time measurements of $[CO_2]$ at two time points over the difference of real time measurements of [C1] at the corresponding two time points; determine the contamination at time1 ($C_{time1}$) by linear fitting on a line determined by time zero wherein contamination is 100% and density is the extrapolated value of the real time density chart and by time when the release of free $CO_2$ begins to occur wherein contamination is B and density is found on the real time density chart; determine $[CO_2]_R$ and $[C1]_R$ according to Equation 1 and 2, respectively; determine whether $[CO_2]_R$ and $[C1]_R$ are equal to or greater than certain confidence level, such as 95% confidence level, comparing to $[CO_2]$ and [C1], respectively. In some embodiments, the method further comprises: output $C_{time1}$ as the contamination at time 1, and $[CO_2]_R$ as the actual amount of $CO_2$ in the formation fluid if the confidence level is satisfied; determine k as $[CO_2]_R/[C1]_R$ and repeat the steps beginning from the determination of B if the confidence level is not satisfied.

Embodiments disclosed herein include: A. A method, including obtaining real time property measurements of a fluid comprising a formation fluid downhole, obtaining real time measurements of an amount of an interactive component of the fluid downhole, obtaining real time measurements of an amount of a non-interactive component of the fluid downhole. The method further includes determining a total amount of the interactive component in the fluid at a time of interest based on the real time property measurements of the fluid downhole and the real time measurements of the amounts of the interactive component and non-interactive component downhole.

B. A method, including obtaining real time property measurements of a fluid comprising a formation fluid downhole, obtaining real time measurements of an amount of an interactive component of the fluid downhole, obtaining real time measurements of an amount of a non-interactive component of the fluid downhole. The method further includes determining a contamination level of the formation fluid at a time of interest based on the real time property measurements of the fluid downhole and the real time measurements of the amounts of the interactive component and non-interactive component downhole.

C. A system including one or more tools having one or more optical computing devices wherein the one or more tools are configured to obtain real time property measurements of a fluid comprising a formation fluid downhole, real time measurements of an amount of an interactive component of the fluid downhole, and real time measurements of an amount of a non-interactive component of the fluid downhole. The system further comprises a memory storing instructions and at least one processor that executes instructions to: determine the total amount of the interactive component or a contamination level of the formation fluid at a time of interest based on the real time property measurements of the fluid downhole and the real time measurements of the amounts of the interactive component and non-interactive component downhole.

Each of embodiments A, B and C may have one or more of the following additional embodiments 1-20 in any combination:

Embodiment 1: A method comprising: receiving, via one or more sensors in a wellbore formed in a subsurface formation, measurements of a concentration of an interactive component and a concentration of a non-interactive component in a formation fluid from the subsurface formation, wherein the non-interactive component and the interactive component comprise a component in the formation fluid that is non-interactive and interactive, respectively, with respect to a drilling fluid; and determining a level of contamination from a drilling fluid filtrate that contaminates the formation fluid based on the non-interactive component concentration in the formation fluid and the interactive component concentration in the formation fluid.

Embodiment 2: The method of claim 1, wherein determining the level of contamination from the drilling fluid filtrate further comprises: determining a first ratio of the concentration of the interactive component to the concentration of the non-interactive component when an initial release of the interactive component begins in the wellbore; and determining a second ratio of the interactive component concentration to the non-interactive component concentration, wherein the second ratio is determined at a time prior to the first ratio, wherein the level of contamination from the drilling fluid filtrate is based on the first ratio of the interactive component concentration to the non-interactive component concentration when the initial release of the interactive component begins in the wellbore, and wherein an initial contamination level of the formation fluid is equal to 100%.

Embodiment 3: The method of claim 2, wherein determining the level of contamination from the drilling fluid filtrate further comprises: determining a density of a pumpout fluid when a release of a free form of the interactive component begins to occur based, at least in part, on the first ratio of the concentration of the interactive component to the concentration of the non-interactive component, wherein the pumpout fluid comprises the formation fluid after being contaminated by the drilling fluid filtrate, and wherein the density is determined from a real time property chart.

Embodiment 4: The method of claim 3, wherein determining the level of contamination from the drilling fluid filtrate further comprises: determining, via extrapolation and based on the density of the pumpout fluid when the release of the free form of the interactive component begins to occur, a density of the drilling fluid filtrate at the initial contamination level; and determining the level of contamination from the drilling fluid filtrate at a time of interest based on the density of the drilling fluid filtrate at the initial contamination level and the density of the pumpout fluid when the initial release of the interactive component begins in the wellbore.

Embodiment 5: The method of claim 4, further comprising: determining total concentrations of the interactive component and the non-interactive component in the formation fluid based, at least in part, on the level of contamination from the drilling fluid filtrate; and determining that the total concentrations of the interactive component and the non-interactive component are equal to or greater than a 95% confidence level, wherein measurements of the interactive component and the non-interactive component obtained by the one or more sensors when the initial release of the interactive component begins in the wellbore are compared to make the determination of the total concentrations.

Embodiment 6: The method of claim 5, further comprising: determining the level of contamination from the drilling fluid filtrate by linear fitting a line determined by the initial contamination level of the formation fluid of 100% and a contamination level of the formation fluid when the initial release of the interactive component begins in the wellbore.

Embodiment 7: The method of claim 6, wherein determining the total concentrations of the interactive component and the non-interactive component in the formation fluid comprises: determining the total concentration of the interactive component according to the following: a measurement of the interactive component concentration obtained by the one or more sensors when the initial release of the interactive component begins in the wellbore=the total concentration of the interactive component*((1−the level of contamination from the drilling fluid filtrate)/B); and determining the total concentration of the non-interactive component according to the following: a measurement of the non-interactive component concentration obtained by the one or more sensors when the initial release of the interactive component begins in the wellbore=the total concentration of the non-interactive component*((1−the level of contamination from the drilling fluid filtrate)/100), wherein B is the contamination level of the formation fluid when the initial release of the interactive component begins in the wellbore, wherein B is equal to k*100/m, wherein k is the first ratio, and wherein m is equal to a ratio of a difference between the concentrations of the interactive component at the initial contamination level and when the initial release of the interactive component begins in the wellbore over a difference between concentrations of the non-interactive component at the initial contamination level and when the initial release of the interactive component begins in the wellbore, respectively.

Embodiment 8: A system for determining drilling fluid filtrate contamination of a formation fluid, the system comprising: one or more sensors placed in a wellbore formed in a subsurface formation and configured to obtain measurements at a plurality of times; memory storing program code; and one or more processors configured to execute the program code, the program code comprising: instructions to receive, via the one or more sensors, measurements of a concentration of an interactive component and a concentration of a non-interactive component in the formation fluid from the subsurface formation, wherein the non-interactive component and the interactive component comprise a component in the formation fluid that is non-interactive and interactive, respectively, with respect to a drilling fluid; and instructions to determine a level of contamination from a drilling fluid filtrate that contaminates the formation fluid based on the non-interactive component concentration in the formation fluid and the interactive component concentration in the formation fluid.

Embodiment 9: The system of claim 8, wherein the instructions to determine the level of contamination from the drilling fluid filtrate further comprise: instructions to determine a first ratio of the concentration of the interactive component to the concentration of the non-interactive component when an initial release of the interactive component begins in the wellbore; and instructions to determine a second ratio of the interactive component concentration to the non-interactive component concentration, wherein the second ratio is determined at a time prior to the first ratio; wherein the level of contamination from the drilling fluid filtrate is based on the first ratio of the interactive component concentration to the non-interactive component concentration when the initial release of the interactive component begins in the wellbore, and wherein an initial contamination level of the formation fluid is equal to 100%.

Embodiment 10: The system of claim 9, wherein the instructions to determine the level of contamination from the drilling fluid filtrate further comprise: instructions to determine a density of a pumpout fluid when a release of a free form of the interactive component begins to occur based, at least in part, on the first ratio of the concentration of the interactive component to the concentration of the non-interactive component, wherein the pumpout fluid comprises the formation fluid after being contaminated by the drilling fluid filtrate, and wherein the density is determined from a real time property chart.

Embodiment 11: The system of claim 10, wherein the instructions to determine the level of contamination from the drilling fluid filtrate further comprise: instructions to determine, via extrapolation and based on the density of the pumpout fluid when the release of the free form of the interactive component begins to occur, a density of the drilling fluid filtrate at the initial contamination level; and instructions to determine the level of contamination from the drilling fluid filtrate at a time of interest based on the density of the drilling fluid filtrate at the initial contamination level and the density of the pumpout fluid when the initial release of the interactive component begins in the wellbore.

Embodiment 12: The system of claim 11, further comprising: instructions to determine total concentrations of the interactive component and the non-interactive component in the formation fluid based, at least in part, on the level of contamination from the drilling fluid filtrate; and instructions to determine that the total concentrations of the interactive component and the non-interactive component are equal to or greater than a 95% confidence level, wherein measurements of the interactive component and the non-interactive component obtained by the one or more sensors when the initial release of the interactive component begins in the wellbore are compared to make the determination of the total concentrations.

Embodiment 13: The system of claim 12, further comprising: instructions to determine the level of contamination from the drilling fluid filtrate by linear fitting a line determined by the initial contamination level of the formation fluid and a contamination level of the formation fluid when the initial release of the interactive component begins in the wellbore.

Embodiment 14: The system of claim 13, wherein the instructions to determine the total concentrations of the interactive component and the non-interactive component in the formation fluid comprise: instructions to determine the total concentration of the interactive component according to the following: a measurement of the interactive component concentration obtained by the one or more sensors when the initial release of the interactive component begins in the wellbore=the total concentration of the interactive component*((1−the level of contamination from the drilling fluid filtrate)/B); and instructions to determine the total concentration of the non-interactive component according to the following: a measurement of the non-interactive component concentration obtained by the one or more sensors when the initial release of the interactive component begins in the wellbore=the total concentration of the non-interactive component*((1−the level of contamination from the drilling fluid filtrate)/100), wherein B is the contamination level of the formation fluid when the initial release of the interactive component begins in the wellbore, wherein B is equal to k*100/m, wherein k is the first ratio, and wherein m is equal to a ratio of a difference between the concentrations of the interactive component at the initial contamination level and when the initial release of the interactive component begins in the wellbore over a difference between concentrations of the non-interactive component at the initial contamination level and when the initial release of the interactive component begins in the wellbore, respectively.

Embodiment 15: One or more non-transitory machine-readable media comprising program code configured to determine drilling fluid filtrate contamination of a formation fluid, the program code executable on one or more processors, the program code comprising: instructions to receive, via one or more sensors placed in a wellbore formed in a subsurface formation, measurements of a concentration of an interactive component and a concentration of a non-interactive component in the formation fluid from the subsurface formation, wherein the non-interactive component and the interactive component comprise a component in the formation fluid that is non-interactive and interactive, respectively, with respect to a drilling fluid; and instructions to determine a level of contamination from a drilling fluid filtrate that contaminates the formation fluid based on the non-interactive component concentration in the formation fluid and the interactive component concentration in the formation fluid.

Embodiment 16: The machine-readable media of claim 15, wherein the instructions to determine the level of contamination from the drilling fluid filtrate further comprise: instructions to determine a first ratio of the concentration of the interactive component to the concentration of the non-interactive component when an initial release of the interactive component begins in the wellbore; and instructions to determine a second ratio of the interactive component concentration to the non-interactive component concentration, wherein the second ratio is determined at a time prior to the first ratio; wherein the level of contamination from the drilling fluid filtrate is based on the first ratio of the interactive component concentration to the non-interactive component concentration when the initial release of the interactive component begins in the wellbore, and wherein an initial contamination level of the formation fluid is equal to 100%.

Embodiment 17: The machine-readable media of claim 16, wherein the instructions to determine the level of contamination from the drilling fluid filtrate further comprise: instructions to determine a density of a pumpout fluid when a release of a free form of the interactive component begins to occur based, at least in part, on the first ratio of the concentration of the interactive component to the concentration of the non-interactive component, wherein the pumpout fluid comprises the formation fluid after being contaminated by the drilling fluid filtrate, and wherein the density is determined from a real time property chart.

Embodiment 18: The machine-readable media of claim 17, wherein the instructions to determine the level of contamination from the drilling fluid filtrate further comprise: instructions to determine, via extrapolation and based on the density of the pumpout fluid when the release of the free form of the interactive component begins to occur, a density of the drilling fluid filtrate at the initial contamination level; and instructions to determine the level of contamination from the drilling fluid filtrate at a time of interest based on the density of the drilling fluid filtrate at the initial contamination level and the density of the pumpout fluid when the initial release of the interactive component begins in the wellbore.

Embodiment 19: The machine-readable media of claim 18, further comprising: instructions to determine total concentrations of the interactive component and the non-interactive component in the formation fluid based, at least in part, on the level of contamination from the drilling fluid filtrate; and instructions to determine that the total concentrations of the interactive component and the non-interactive component are equal to or greater than a 95% confidence level, wherein measurements of the interactive component and the non-interactive component obtained by the one or more sensors when the initial release of the interactive component begins in the wellbore are compared to make the determination of the total concentrations.

Embodiment 20: The machine-readable media of claim 19, further comprising: instructions to determine the level of contamination from the drilling fluid filtrate by linear fitting a line determined by the initial contamination level of the formation fluid and a contamination level of the formation fluid when the initial release of the interactive component begins in the wellbore.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is:

1. A method comprising:

receiving, via one or more sensors in a wellbore formed in a subsurface formation, real-time measurements of a concentration of an interactive component and a concentration of a non-interactive component in a first fluid comprising at least a formation fluid from the subsurface formation, wherein the non-interactive component and the interactive component comprise a component in the formation fluid that is chemically non-interactive and chemically interactive, respectively, with respect to, at least in part, at least one component of a second fluid that is non-native to the subsurface formation;

determining at least one of a level of contamination from the second fluid that contaminates the formation fluid at a time of interest based, at least in part, on the concentration of the non-interactive component in the formation fluid and the concentration of the interactive component in the formation fluid, wherein the time of interest is a time after a release of a free form of the interactive component begins in the wellbore; and altering an operation in the wellbore based, at least in part, on the level of contamination from the second fluid.

2. The method of claim 1, wherein determining the level of contamination from the second fluid further comprises:

determining a first ratio as the concentration of the interactive component over the concentration of the non-interactive component when the release of the free form of the interactive component begins in the wellbore;

determining a second ratio relating the concentration of the interactive component to the concentration of the non-interactive component at two time points; and determining a breakthrough contamination level when the release of the free form of the interactive component begins in the wellbore based, at least in part, on the first ratio and the second ratio, wherein the level of contamination from the second fluid is based on the first ratio of the concentration of the interactive component to the concentration of the non-interactive component when the release of the free form of the interactive component begins in the wellbore, and wherein an initial contamination level of the formation fluid is sufficient to account for the contamination within a desired error of the real-time measurements.

3. The method of claim 2, wherein determining the level of contamination from the second fluid further comprises:

determining a density of the first fluid when the release of the free form of the interactive component begins in the wellbore based, at least in part, on the first ratio of the concentration of the interactive component to the concentration of the non-interactive component, wherein the first fluid comprises the formation fluid after being contaminated by the second fluid, and wherein the density is determined from a real time property chart.

4. The method of claim 3, wherein determining the level of contamination from the second fluid further comprises:

determining, via extrapolation and based on the density of the first fluid when the release of the free form of the interactive component begins to occur, a density of the second fluid at the initial contamination level; and determining the level of contamination from the second fluid at the time of interest based on the density of the second fluid at the initial contamination level and the density of the first fluid when the release of the free form of the interactive component begins in the wellbore.

5. The method of claim 1, further comprising:

determining total concentrations of the interactive component and the non-interactive component in the formation fluid based, at least in part, on the level of contamination from the second fluid; and determining that the total concentrations of the interactive component and the non-interactive component are equal to or greater than a 95% confidence level, wherein the real-time measurements of the interactive component and the non-interactive component obtained by the one or more sensors when the release of the free form of the interactive component begins in the wellbore are compared to make the determination of the total concentrations.

6. The method of claim 1, further comprising:

determining the level of contamination from the second fluid by linear fitting a line determined by an initial contamination level of the formation fluid of 100% and a contamination level of the formation fluid when the release of the free form of the interactive component begins in the wellbore.

7. The method of claim 1, further comprising:

determining a total concentration of the interactive component in the formation fluid according to the following:

a measurement of the concentration of the interactive component obtained by the one or more sensors when the release of the free form of the interactive component begins in the wellbore, wherein the measurement of the concentration of the interactive component is dependent on the concentration of the interactive component with respect to the level of contamination from the second fluid and a time or a fluid volume at which the interactive component is first observed; and determining a total concentration of the non-interactive component in the formation fluid according to the following:

a measurement of the concentration of the non-interactive component obtained by the one or more sensors when the release of the free form of the interactive component begins in the wellbore, wherein the measurement of the concentration of the non-interactive component is dependent on the concentration of the non-interactive component with respect to the level of contamination from the second fluid.

8. A system for determining nonnative a fluid contamination of a formation fluid, the system comprising:

one or more sensors to be positioned in a wellbore formed in a subsurface formation and configured to obtain measurements at a plurality of times;

memory storing program code; and one or more processors configured to execute the program code, the program code comprising:

instructions to obtain, via the one or more sensors, real-time measurements of a concentration of an interactive component and a concentration of a non-interactive component in a first fluid comprising at least the formation fluid from the subsurface formation, wherein the non-interactive component and the interactive component comprise a component in the formation fluid that is chemically non-interactive and chemically interactive, respectively, with respect to, at least in part, at least one component of a second fluid that is non-native to the subsurface formation;

instructions to determine at least one of a level of contamination from the second fluid that contaminates the formation fluid at a time of interest based, at least in part, on the concentration of the non-interactive component in the formation fluid and the concentration of the interactive component in the formation fluid, wherein the time of interest is a time after a release of a free form of the interactive component begins in the wellbore; and instructions to alter an operation in the wellbore based, at least in part, on the level of contamination from the second fluid.

9. The system of claim 8, wherein the instructions to determine the level of contamination from the second fluid further comprise:

instructions to determine a first ratio as the concentration of the interactive component over the concentration of the non-interactive component when the release of the free form of the interactive component begins in the wellbore;

instructions to determine a second ratio relating the concentration of the interactive component to the concentration of the non-interactive component at two time points; and instructions to determine a breakthrough contamination level when the release of the free form of the interactive component begins in the wellbore based, at least in part, on the first ratio and the second ratio, wherein the level of contamination from the second fluid is based on the first ratio of the concentration of the interactive component to the concentration of the non-interactive component when the release of the free form of the interactive component begins in the wellbore, and wherein an initial contamination level of the formation fluid is sufficient to account for the contamination within a desired error of the real-time measurements.

10. The system of claim 9, wherein the instructions to determine the level of contamination from the second fluid further comprise:

instructions to determine a density of the first fluid when the release of the free form of the interactive component begins in the wellbore based, at least in part, on the first ratio of the concentration of the interactive component to the concentration of the non-interactive component, wherein the first fluid comprises the formation fluid after being contaminated by the second fluid, and wherein the density is determined from a real time property chart.

11. The system of claim 10, wherein the instructions to determine the level of contamination from the second fluid further comprise:

instructions to determine, via extrapolation and based on the density of the first fluid when the release of the free form of the interactive component begins to occur, a density of the second fluid at the initial contamination level; and instructions to determine the level of contamination from the second fluid at the time of interest based on the density of the second fluid at the initial contamination level and the density of the first fluid when the release of the free form of the interactive component begins in the wellbore.

12. The system of claim 8, further comprising:

instructions to determine total concentrations of the interactive component and the non-interactive component in the formation fluid based, at least in part, on the level of contamination from the second fluid; and instructions to determine that the total concentrations of the interactive component and the non-interactive component are equal to or greater than a 95% confidence level, wherein the real-time measurements of the interactive component and the non-interactive component obtained by the one or more sensors when the release of the free form of the interactive component begins in the wellbore are compared to make the determination of the total concentrations.

13. The system of claim 8, further comprising:

instructions to determine the level of contamination from the second fluid by linear fitting a line determined by an initial contamination level of the formation fluid and a contamination level of the formation fluid when the release of the free form of the interactive component begins in the wellbore.

14. The system of claim 8, further comprising:

instructions to determine a total concentration of the interactive component in the formation fluid according to the following:

a measurement of the concentration of the interactive component obtained by the one or more sensors when the release of the free form of the interactive component begins in the wellbore, wherein the measurement of the concentration of the interactive component is dependent on the concentration of the interactive component with respect to the level of contamination from the second fluid and a time or a fluid volume at which the interactive component is first observed; and instructions to determine a total concentration of the non-interactive component in the formation fluid according to the following:

a measurement of the concentration of the non-interactive component obtained by the one or more sensors when the release of the free form of the interactive component begins in the wellbore, wherein the measurement of the concentration of the non-interactive component is dependent on the concentration of the non-interactive component with respect to the level of contamination from the second fluid.

15. One or more non-transitory machine-readable media comprising program code configured to determine a contamination of a formation fluid, the program code executable on one or more processors, the program code comprising:

instructions to receive, via one or more sensors to be positioned in a wellbore formed in a subsurface formation, real-time measurements of a concentration of an interactive component and a concentration of a non-interactive component in a first fluid comprising at least the formation fluid from the subsurface formation, wherein the non-interactive component and the interactive component comprise a component in the formation fluid that is chemically non-interactive and chemically interactive, respectively, with respect to, at least in part, at least one component of a second fluid that is non-native to the subsurface formation;

instructions to determine at least one of a level of contamination from the second fluid that contaminates the formation fluid at a time of interest based, at least in part, on the concentration of the non-interactive component in the formation fluid and the concentration of the interactive component in the formation fluid, wherein the time of interest is a time after a release of a free form of the interactive component begins in the wellbore; and instructions to alter an operation in the wellbore based, at least in part, on the level of contamination from the second fluid.

16. The machine-readable media of claim 15, wherein the instructions to determine the level of contamination from the second fluid further comprise:

instructions to determine a first ratio as the concentration of the interactive component over the concentration of the non-interactive component when the release of the free form of the interactive component begins in the wellbore;

instructions to determine a second ratio relating the concentration of the interactive component to the concentration of the non-interactive component at two time points; and instructions to determine a breakthrough contamination level when the release of the free form of the interactive component begins in the wellbore based, at least in part, on the first ratio and the second ratio, wherein the level of contamination from the second fluid is based on the first ratio of the concentration of the interactive component to the concentration of the non-interactive component when the release of the free form of the interactive component begins in the wellbore, and wherein an initial contamination level of the formation fluid is sufficient to account for the contamination within a desired error of the real-time measurements.

17. The machine-readable media of claim 16, wherein the instructions to determine the level of contamination from the second fluid further comprise:

instructions to determine a density of the first fluid when the release of the free form of the interactive component begins in the wellbore based, at least in part, on the first ratio of the concentration of the interactive component to the concentration of the non-interactive component, wherein the first fluid comprises the formation fluid after being contaminated by the second fluid, and wherein the density is determined from a real time property chart.

18. The machine-readable media of claim 17, wherein the instructions to determine the level of contamination from the second fluid further comprise:

instructions to determine, via extrapolation and based on the density of the first fluid when the release of the free form of the interactive component begins to occur, a density of the second fluid at the initial contamination level; and instructions to determine the level of contamination from the second fluid at the time of interest based on the density of the second fluid at the initial contamination level and the density of the first fluid when the release of the free form of the interactive component begins in the wellbore.

19. The machine-readable media of claim 15, further comprising:

instructions to determine total concentrations of the interactive component and the non-interactive component in the formation fluid based, at least in part, on the level of contamination from the second fluid; and instructions to determine that the total concentrations of the interactive component and the non-interactive component are equal to or greater than a 95% confidence level, wherein the real-time measurements of the interactive component and the non-interactive component obtained by the one or more sensors when the release of the free form of the interactive component begins in the wellbore are compared to make the determination of the total concentrations.

20. The machine-readable media of claim 15, further comprising:

instructions to determine the level of contamination from the second fluid by linear fitting a line determined by an initial contamination level of the formation fluid and a contamination level of the formation fluid when the release of the free form of the interactive component begins in the wellbore.

* * * * *